(12) United States Patent
Campion et al.

(10) Patent No.: US 8,894,414 B2
(45) Date of Patent: Nov. 25, 2014

(54) G-CUEING SIMULATOR FOR HIGH-PERFORMANCE VEHICLES, IN PARTICULAR F1 CARS

(75) Inventors: Graham Campion, Bedford (GB); Ian Norton, Bedford (GB); Phil Abbott, Bedford (GB)

(73) Assignee: Cranfield Aerospace Ltd, Cranfield, Bedforshire (GB)

( * ) Notice: Subject to any disclaimer, the term of this patent is extended or adjusted under 35 U.S.C. 154(b) by 0 days.

(21) Appl. No.: 13/197,847

(22) Filed: Aug. 4, 2011

(65) Prior Publication Data

US 2012/0288831 A1    Nov. 15, 2012

(51) Int. Cl.
  *G09B 9/04* (2006.01)
  *G09B 9/05* (2006.01)
  *G09B 9/048* (2006.01)

(52) U.S. Cl.
  CPC . *G09B 9/048* (2013.01); *G09B 9/05* (2013.01)
  USPC .......................................................... 434/62

(58) Field of Classification Search
  USPC ........... 434/29, 38, 40, 43, 44, 48, 61, 62, 69; 472/130
  See application file for complete search history.

(56) References Cited

U.S. PATENT DOCUMENTS

| | | | |
|---|---|---|---|
| 4,464,117 A | 8/1984 | Foerst | |
| 5,431,569 A * | 7/1995 | Simpkins et al. | 434/29 |
| 5,490,784 A * | 2/1996 | Carmein | 434/55 |
| 5,865,624 A * | 2/1999 | Hayashigawa | 434/66 |
| 5,885,080 A * | 3/1999 | Letovsky | 434/62 |
| 5,921,780 A | 7/1999 | Myers | |
| 6,079,982 A * | 6/2000 | Meader | 434/29 |
| 6,431,872 B1 * | 8/2002 | Shiraishi et al. | 434/69 |
| 6,505,503 B1 * | 1/2003 | Teresi et al. | 73/118.01 |
| 6,752,716 B1 * | 6/2004 | Nishimura et al. | 463/6 |
| 6,776,722 B2 * | 8/2004 | De-Gol | 472/59 |
| 6,813,595 B2 * | 11/2004 | Edgar | 703/8 |
| 7,021,937 B2 * | 4/2006 | Simpson et al. | 434/62 |
| 7,685,945 B2 * | 3/2010 | Norbury | 104/60 |
| 2002/0164560 A1 * | 11/2002 | Borta | 434/55 |
| 2007/0262628 A1 | 11/2007 | Perigny | |

FOREIGN PATENT DOCUMENTS

| | | | |
|---|---|---|---|
| CA | 2209252 | 1/1999 | |
| DE | 19953211 | 5/2001 | |
| GB | 1 405 333 | 9/1975 | |
| GB | 1 531 995 | 11/1978 | |
| GB | 2 378 687 | 2/2003 | |
| GB | 2427179 | * 12/2006 | G09B 9/04 |
| WO | 94/04999 | 3/1994 | |
| WO | 98/59330 | 12/1998 | |
| WO | WO 98/59330 | * 12/1998 | G09B 9/10 |
| WO | 01/52958 A1 | 7/2001 | |

OTHER PUBLICATIONS

International Search Report corresponding to International Application No. PCT/GB2010/000201 dated May 7, 2010.

* cited by examiner

*Primary Examiner* — Kurt Fernstrom
(74) *Attorney, Agent, or Firm* — Renner, Otto, Boisselle & Sklar, LLP

(57) ABSTRACT

A G-cueing simulator for a ground vehicle which includes a plurality of actuators which are operable to provide GO cues to a user in a simulated environment.

31 Claims, 2 Drawing Sheets

G-CUEING SIMULATOR FOR HIGH-PERFORMANCE VEHICLES, IN PARTICULAR F1 CARS

Figure 1:
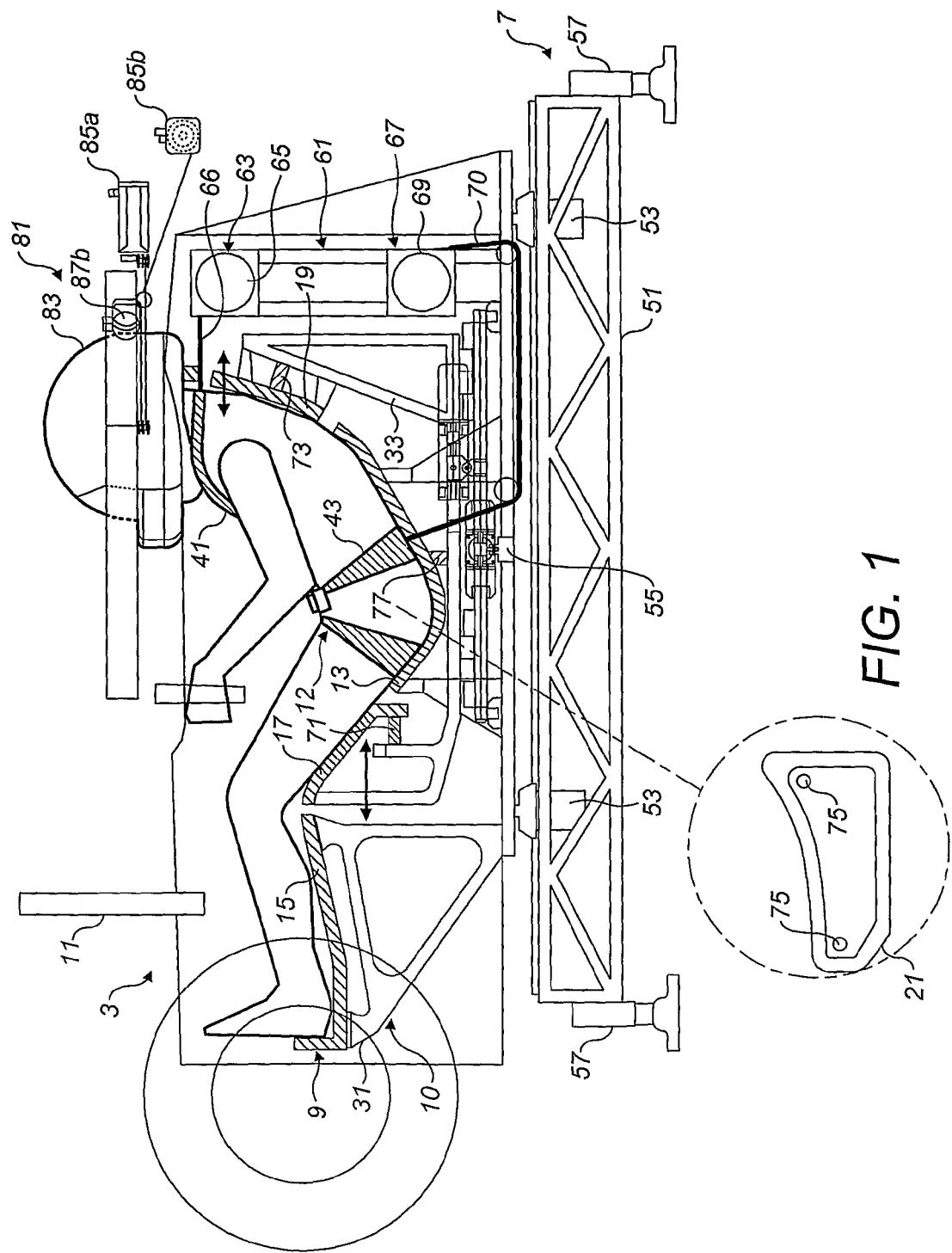

This application is a continuation of International Application No. PCT/GB2010/000201, filed on Feb. 4, 2010 and which is hereby incorporated herein by reference in its entirety.

The present invention relates to a G-cueing simulator for high-performance vehicles, such as high-performance racing cars, and in particular F1 cars.

G-cueing is the provision of cues to a user, which stimulate the nervous system to perceive G-loadings, in co-ordination with a computer-generated visual simulation. These cues are provided by the use of actuators which typically apply force and motion to the user. These forces and motions are not of the scale as experienced in the real-life environment, but sufficient cues to cause the brain to react by producing the associated physiological responses. With G-cueing, a more realistic simulated environment is created which leads to greater user immersion (concentration) and delivers a more effective training experience.

The applicant currently supplies a G-cueing simulator for aircraft, and, whilst the requirements for high-performance vehicles are quite different to those for aircraft, it is an aim of the present invention to provide a G-cueing simulator for high-performance vehicles, such as high-performance racing cars, and in particular F1 cars.

In one aspect the present invention provides a G-cueing simulator for a ground vehicle which includes a plurality of actuators which are operable to provide G-cues to a user in a simulated environment.

In one embodiment the ground vehicle is a high-performance vehicle, preferably an F1 car.

In one embodiment the simulator comprises a cockpit in which the user sits.

In one embodiment the cockpit comprises a seat in which the user sits, a support frame which supports the seat, user inputs which are operated by the user in driving the vehicle, and a visual display for displaying a visual simulation of the environment to the user.

In one embodiment the user inputs include foot-operated inputs and hand-operated inputs.

In one embodiment the cockpit further comprises an audio output for providing an audio simulation of the environment to the user.

In one embodiment the seat comprises a form-fitting shell and a seat harness which fixes the user in the seat.

In one embodiment the seat comprises a lower section, which supports the buttocks and lower back of the user, a forward section, which is raised relative to the lower section and supports the feet and lower legs of the user, an intermediate section, which is intermediate the lower section and the forward section and inclined upwardly in the forward direction to support the upper legs and buttocks of the user, and a rear section, which supports the upper back and shoulders of the driver.

In one embodiment the seat further comprises lateral sections which are disposed to the respective sides of the upper legs and torso of the user.

In one embodiment the seat harness comprises a shoulder harness and a lap harness.

In one embodiment the support frame comprises a first, main frame part to which the lower section and the forward section of the seat are fixed, and a second, movable frame part which is movably mounted to the main frame part and to which the intermediate section and the rear section are supported, whereby the intermediate section can be moved rearwardly to apply a pressure on the upper legs and buttocks of the user and provide a cue for deceleration/braking and the rear section can be moved forwardly to apply a pressure on the upper back and shoulders of the user and provide a cue for acceleration.

In one embodiment the cockpit further comprises a harness tensioner for tensioning/de-tensioning the seat harness, which provides cues for acceleration and deceleration/braking.

In one embodiment the cockpit further comprises at least one longitudinal force transducer for providing a longitudinal pressure to the user and thereby provide an acceleration/deceleration cue.

In one embodiment the cockpit comprises first and second longitudinal force transducers.

In one embodiment the first longitudinal force transducer is operative to apply a force to the upper legs and buttocks of the user, with an increasing force providing a cue for deceleration/braking and a decreasing force providing a cue for acceleration.

In one embodiment the first longitudinal force transducer is located adjacent the intermediate section of the seat, such as to transmit a pressure through the seat wall.

In one embodiment the first longitudinal force transducer comprises first and second pads for applying pressure to respective ones of the upper legs and buttocks of the user.

In one embodiment the second longitudinal force transducer is operative to apply a force to the upper back and shoulders of the user, with an increasing force providing a cue for acceleration and a decreasing force providing a cue for deceleration/braking.

In one embodiment the second longitudinal force transducer is located adjacent the rear section of the seat, such as to transmit a pressure through the seat wall.

In one embodiment the cockpit further comprises at least two lateral force transducers in the lateral sections of the seat for providing a lateral pressure to the user and thereby provide a cue for lateral acceleration/deceleration to the user.

In one embodiment the cockpit comprises a plurality of lateral force transducers in each of the lateral sections of the seat.

In one embodiment the cockpit comprises first and second force transducers in each of the lateral sections of the seat for applying pressure, respectively, to the upper legs and torso of the user.

In one embodiment the cockpit further comprises at least one vertical force transducer for providing a vertical pressure to the user and thereby a cue for vertical acceleration to the user.

In one embodiment the vertical acceleration cue is a buffeting/vibration cue.

In one embodiment the vertical force transducer is located adjacent the intermediate section of the seat, such as to transmit a pressure through the seat wall.

In one embodiment the cockpit further comprises a helmet assembly for providing longitudinal and lateral cues to the head of the user.

In one embodiment the helmet assembly comprises a helmet which is worn by the user, at least one longitudinal actuator for longitudinally moving the head of the user and providing a longitudinal acceleration/deceleration cue to the user, and at least one lateral actuator for laterally moving the head of the user and providing a lateral acceleration/deceleration cue to the user.

In one embodiment the helmet assembly comprises first and second longitudinal actuators which are coupled to the helmet such as to cause fore or aft movement of the helmet.

In one embodiment the helmet assembly comprises first and second lateral actuators which are coupled to respective sides of the helmet such as to cause lateral movement of the helmet.

In one embodiment the helmet includes at least one force transducer which is disposed internally to the helmet such as to provide for at least one acceleration/deceleration cue to the user.

In one embodiment the at least one force transducer is further operative to cue a force reversal which occurs when the helmet rests on a cockpit surround.

In one embodiment the helmet includes a plurality of force transducers for providing acceleration/deceleration cues to the user.

In one embodiment the helmet includes first and second lateral force transducers which are located to the respective sides of the head of the user and operative to provide a controlled pressure to the respective side of the head of the user.

In one embodiment the helmet includes a longitudinal force transducer which is located to the rear of the head of the user and operative to provide a controlled pressure to the rear of the head of the user.

In one embodiment the simulator further comprises a motion platform to which the cockpit is movably supported, such as to provide motion-stimulated G-cues.

In one embodiment the cockpit is movable laterally on the motion platform.

In one embodiment the cockpit is rotatable on the motion platform.

In one embodiment the motion platform comprises a support frame to which the cockpit is movably supported, and a plurality of actuators which are actuatable to alter one or both of the height and inclination of the cockpit, preferably both laterally and fore-to-aft.

In another aspect the present invention provides a G-cueing seat for a ground vehicle which includes a plurality of actuators which are operable to provide G-cues to a user in a simulated environment.

Figure 2:
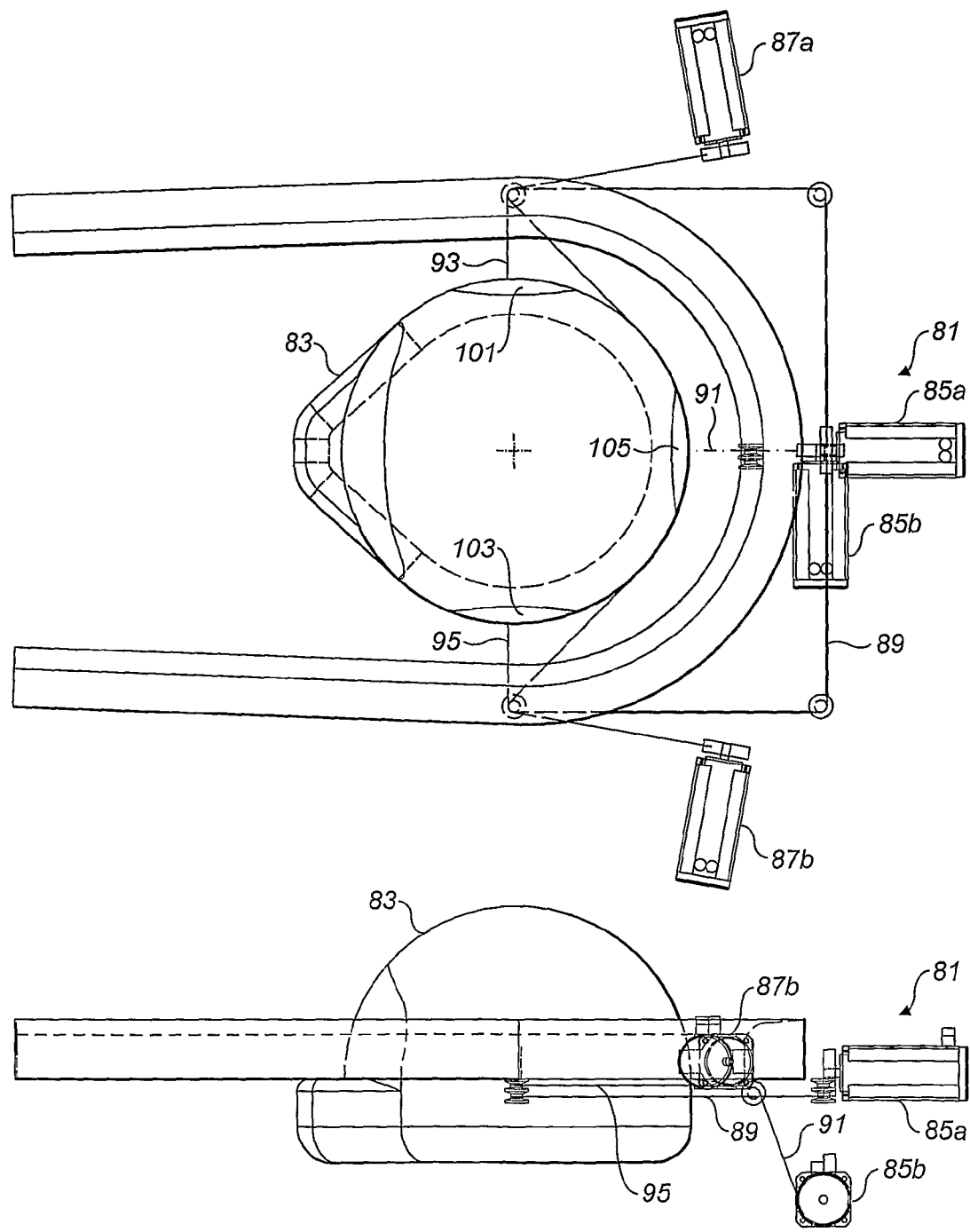

A preferred embodiment of the present invention will now be described hereinbelow by way of example only with reference to the accompanying drawings, in which:

FIG. 1 illustrates a G-cueing simulator for a high-performance vehicle in accordance with a preferred embodiment of the present invention; and FIG. 2 illustrates the helmet assembly of the G-cueing simulator of FIG. 1.

The G-cueing simulator comprises a cockpit 3 in which a user, as a driver, sits, a motion platform 7 to which the cockpit 3 is movably supported, and a controller (not illustrated), here a PC-based controller, for controlling operation of the G-cueing simulator.

The cockpit 3 comprises a seat 9 in which the user sits, a support frame 10 which supports the seat 9, user inputs including foot-operated inputs, including an accelerator and brake, and hand-operated inputs, including a steering wheel and gear selector, a visual display 11 for displaying a visual simulation of the driving environment to the user, and an audio output (not illustrated) for providing an audio simulation of the driving environment to the user.

In this embodiment the seat 9 comprises a form-fitting shell, which includes no cushioning and defines an almost horizontal seating position, and a seat harness 12, here a six-point harness, which fixes the user tight in the seat 9.

In this embodiment the seat 9 comprises a lower, well-shaped section 13, which supports the buttocks and lower back of the user, a forward section 15, which is raised relative to the well-shaped section 13 and supports the feet and lower legs of the user, an intermediate section 17, which is intermediate the well-shaped section 13 and the forward section 15 and inclined upwardly in the forward direction to support the upper legs (thighs) and buttocks of the user, and a rear section 19, which supports the upper back and shoulders of the user.

In this embodiment the seat 9 further comprises lateral sections 21 which are disposed to the respective lateral sides of the upper legs and torso of the driver.

In this embodiment the support frame 10 comprises a first, main frame part 31 to which the well-shaped section 13 and the forward section 15 of the seat 9 are fixed, and a second, movable frame part 33 which is movably mounted to the main frame part 31 and to which the intermediate section 17 and the rear section 19 of the seat 9 are supported. With this configuration, the intermediate section 17 can be moved rearwardly to apply a pressure on the upper legs and buttocks of the user, which is a cue for deceleration/braking, and the rear section 19 can be moved forward to apply a pressure on the upper back and shoulders of the user, which is a cue for acceleration. In one embodiment the intermediate section 17 is movable independently of the rear section 19. In another embodiment the intermediate section 17 and the rear section 19 are moved as an integral unit.

In this embodiment the seat harness 12 comprises a shoulder harness 41, here a pair of straps, and a lap harness 43, here two pairs of straps.

In this embodiment the motion platform 7 comprises a support frame 51 to which the cockpit 3 is movably supported, here on bearings 53, and actuators for moving the cockpit 3.

In this embodiment the cockpit 3 is rotatably coupled to the support frame 51 about a pivot 55. With this configuration, the cockpit 3 is rotatable, which is a cue for yawing.

In this embodiment the cockpit 3 is movably laterally to the support frame 51, which is a cue for front and rear tyre slip, and longitudinally, which is a cue for acceleration/deceleration.

In this embodiment the motion platform 7 includes a plurality of actuators 57, here four actuators at respective corners of the support frame 51, which are actuatable both to alter the height of the cockpit 3 and to confer an inclination to the cockpit 3, here both laterally and fore-to-aft, which provides cues for pitching and rolling.

The cockpit 3 further comprises a harness tensioner 61 for tensioning/de-tensioning the seat harness 12, which provides cues for acceleration and deceleration/braking.

In this embodiment the harness tensioner 61 comprises a first harness tensioner 63 which comprises an actuator 65, here a motor, and a link 66 which is directly coupled to the shoulder harness 41 to allow for tensioning/de-tensioning of the same, and a second harness tensioner 67 which comprises an actuator 69, here a motor, and a link 70 which is directly coupled to the lap harness 43 to allow for tensioning/de-tensioning of the same, where tensioning of the seat harness 12, in particular the shoulder harness 41, provides a cue for deceleration/braking and de-tensioning of the seat harness 12, in particular the shoulder harness 41, provides a cue for acceleration.

The cockpit 3 further comprises at least one, in this embodiment first and second force transducers 71, 73 for providing a longitudinal cue, that is, an acceleration/deceleration cue.

In this embodiment the first force transducer 71 is operative to apply a force to the upper legs and buttocks of the user, with an increasing force providing a cue for deceleration/braking and a decreasing force providing a cue for acceleration.

In this embodiment the first force transducer 71 is located adjacent the intermediate section 17 of the seat 9, such as to transmit a pressure through the seat wall, and comprises first and second pads for applying pressure to respective ones of the upper legs and buttocks of the user.

In this embodiment the second force transducer 73 is operative to apply a force to the upper back and shoulders of the user, with an increasing force providing a cue for acceleration and a decreasing force providing a cue for deceleration/braking.

In this embodiment the second force transducer 73 is located adjacent the rear section 19 of the seat 9, such as to transmit a pressure through the seat wall, and comprises a pad which extends across the width of the shoulders.

The cockpit 3 further comprises at least two lateral force transducers 75, which are located in respective ones of the lateral sections 21 of the seat 9, for providing a lateral cue, that is, a lateral acceleration/deceleration cue, with an increasing force in one of the force transducers 75 and a decreasing force in the other of the force transducers 75 providing a cue for lateral acceleration/deceleration.

In this embodiment the cockpit 3 comprises a plurality of force transducers 75 in each of the lateral sections 21 of the seat 9, here first and second force transducers 75 in each of the lateral sections 21, for applying pressure, respectively, to the upper legs and torso of the user.

The cockpit 3 further comprises at least one vertical force transducer 77 for providing a vertical cue, that is, a buffeting/vibration cue.

In this embodiment the vertical force transducer 77 is located adjacent the intermediate section 17 of the seat 9, such as to transmit a pressure through the seat wall.

The cockpit 3 further comprises a helmet assembly 81 for providing longitudinal and lateral cues to the head of the user, and yet allowing for "free" rotation of the head of the user.

In this embodiment the helmet assembly 81 comprises a helmet 83 which is worn by the user, at least one longitudinal actuator 85 for longitudinally moving the head of the user, that is, fore and aft, and providing an acceleration/deceleration cue to the user, and at least one lateral actuator 87 for laterally moving the head of the user and providing a lateral acceleration/deceleration cue to the user.

In this embodiment the helmet assembly 81 comprises first and second longitudinal actuators 85*a, b*, here motors, which are coupled by respective lines and pulleys 89, 91 to the helmet 83, such as to cause fore or aft movement of the helmet 83.

In this embodiment the helmet assembly 81 comprises first and second lateral actuators 87*a, b*, here motors, which are coupled by respective lines and pulleys 93, 95 to the helmet 83, such as to cause lateral movement of the helmet 83.

In this embodiment the helmet 83 includes at least one, here a plurality of force transducers 101, 103, 105, which are disposed internally to the helmet 83, such as to provide for acceleration/deceleration cues to the user and also cue a force reversal which occurs when the helmet 83 rests on the cockpit surround, such as achieved in high-G cornering.

In this embodiment the helmet 83 includes first and second lateral force transducers 101, 103 which are located to the respective sides of the head of the user and operative to provide a controlled pressure to the respective side of the head of the user.

In this embodiment the helmet 83 includes a longitudinal force transducer 105 which is located to the rear of the head of the user and operative to provide a controlled pressure to the rear of the head of the user.

In this embodiment the force transducers 101, 103, 105 comprise pressure pads.

In operation, the controller controls the visual display 11 and audio output to present a visual and audio simulation to the user in response to the user inputs, and, in co-ordination with the simulation, the user is provided with the above-described cues to cause the brain of the user to react by producing associated physiological responses, thereby creating a more realistic simulated environment.

Finally, it will be understood that the present invention has been described in its preferred embodiment and can be modified in many different ways without departing from the scope of the invention as defined by the appended claims.

For example, although the present invention has been described in relation to the use of motorized actuators, it should be understood that the actuators could be of any suitable kind, which includes electric motors, hydraulic drives, pneumatic drives and electro-magnetic drives.

Also, the present invention has been described in terms of a complete G-cueing simulator, but it should be understood that the cockpit 3 could be fitted to an existing motion platform.

The invention claimed is:

1. A G-cueing simulator for a ground vehicle which comprises a cockpit in which a user sits and a plurality of actuators which are operable to provide G-cues to a user in a simulated environment, wherein the cockpit comprises a seat in which the user sits, a support frame which supports the seat, user inputs which are operated by the user in driving the vehicle, and a visual display for displaying a visual simulation of the environment to the user, wherein the seat comprises a form-fitting shell and a seat harness which fixes the user in the seat, and the seat comprises a lower section, which supports the buttocks and lower back of the user, a forward section, which is raised relative to the lower section and supports the feet and lower legs of the user, an intermediate section, which is intermediate the lower section and the forward section and inclined upwardly in the forward direction to support the upper legs and buttocks of the user, and a rear section, which supports the upper back and shoulders of the user.

2. The simulator of claim 1, wherein the ground vehicle is a high-performance vehicle or an F1 car.

3. The simulator of claim 1, wherein the user inputs include foot-operated inputs and hand-operated inputs.

4. The simulator of claim 1, wherein the seat further comprises lateral sections which are disposed to the respective sides of the upper legs and torso of the user.

5. The simulator of claim 1, wherein the support frame comprises a first, main frame part to which the lower section and the forward section of the seat are fixed, and a second, movable frame part which is movably mounted to the main frame part and to which the intermediate section and the rear section are supported, whereby the intermediate section can be moved rearwardly to apply a pressure on the upper legs and buttocks of the user and provide a cue for deceleration/braking and the rear section can be moved forwardly to apply a pressure on the upper back and shoulders of the user and provide a cue for acceleration.

6. The simulator of claim 1, wherein the cockpit further comprises a harness tensioner for tensioning/de-tensioning the seat harness, which provides cues for acceleration and deceleration/braking.

7. The simulator of claim 1, wherein the cockpit further comprises at least one longitudinal force transducer for providing a longitudinal pressure to the user and thereby provide an acceleration/deceleration cue.

8. The simulator of claim 1, wherein the cockpit further comprises at least two lateral force transducers in the lateral sections of the seat for providing a lateral pressure to the user and thereby provide a cue for lateral acceleration/deceleration to the user.

9. The simulator of claim 8, wherein the cockpit comprises a plurality of lateral force transducers in each of the lateral sections of the seat.

10. The simulator of claim 8, wherein the cockpit comprises first and second force transducers in each of the lateral sections of the seat for applying pressure, respectively, to the upper legs and torso of the user.

11. The simulator of claim 1, wherein the cockpit further comprises at least one vertical force transducer for providing a vertical pressure to the user and thereby a cue for vertical acceleration to the user.

12. The simulator of claim 11, wherein the vertical acceleration cue is a buffeting/vibration cue.

13. The simulator of claim 11, wherein the vertical force transducer is located adjacent the intermediate section of the seat to transmit a pressure through a wall of the seat.

14. The simulator of claim 1, further comprising a motion platform to which the cockpit is movably supported to provide motion-stimulated G-cues, wherein the cockpit is movable laterally and rotatable on the motion platform and the motion platform comprises a support frame to which the cockpit is movably supported, and a plurality of actuators which are actuatable to alter one or both of the height and inclination of the cockpit.

15. The simulator of claim 14, wherein the motion platform comprises a support frame to which the cockpit is movably supported, and a plurality of actuators which are actuatable to alter one or both of the height and inclination of the cockpit, both laterally and fore-to-aft.

16. The simulator of claim 1, wherein the cockpit further comprises an audio output for providing an audio simulation of the environment to the user.

17. The simulator of claim 1, wherein the seat harness comprises a shoulder harness and a lap harness.

18. The simulator of claim 7, wherein the cockpit comprises first and second longitudinal force transducers.

19. The simulator of claim 18, wherein the first longitudinal force transducer is operative to apply a force to the upper legs and buttocks of the user, with an increasing force providing a cue for deceleration/braking and a decreasing force providing a cue for acceleration.

20. The simulator of claim 19, wherein the first longitudinal force transducer is located adjacent the intermediate section of the seat to transmit a pressure through a wall of the seat.

21. The simulator of claim 19, wherein the first longitudinal force transducer comprises first and second pads for applying pressure to respective ones of the upper legs and buttocks of the user.

22. The simulator of claim 18, wherein the second longitudinal force transducer is operative to apply a force to the upper back and shoulders of the user, with an increasing force providing a cue for acceleration and a decreasing force providing a cue for deceleration/braking.

23. The simulator of claim 22, wherein the second longitudinal force transducer is located adjacent the rear section of the seat to transmit a pressure through a wall of the seat.

24. A G-cueing simulator for a ground vehicle which comprises a cockpit in which a user sits and a plurality of actuators which are operable to provide G-cues to a user in a simulated environment, wherein the cockpit comprises a helmet assembly for providing longitudinal and lateral cues to a head of the user, wherein the helmet assembly comprises a helmet which is worn by the user and the helmet includes at least one force transducer which is disposed internally to the helmet to provide for at least one acceleration/deceleration cue to the user.

25. The simulator of claim 24, wherein the helmet assembly further comprises at least one longitudinal actuator for longitudinally moving the head of the user and providing a longitudinal acceleration/deceleration cue to the user, and at least one lateral actuator for laterally moving the head of the user and providing a lateral acceleration/deceleration cue to the user.

26. The simulator of claim 25, wherein the helmet assembly comprises first and second longitudinal actuators which are coupled to the helmet to cause fore or aft movement of the helmet.

27. The simulator of claim 25, wherein the helmet assembly comprises first and second lateral actuators which are coupled to respective sides of the helmet to cause lateral movement of the helmet.

28. The simulator of claim 24, wherein the at least one force transducer is further operative to cue a force reversal which occurs when the helmet rests on a cockpit surround.

29. The simulator of claim 24, wherein the helmet includes a plurality of force transducers for providing acceleration/deceleration cues to the user.

30. The simulator of claim 29, wherein the helmet includes first and second lateral force transducers which are located to the respective sides of the head of the user and operative to provide a controlled pressure to the respective side of the head of the user.

31. The simulator of claim 29, wherein the helmet includes a longitudinal force transducer which is located to the rear of the head of the user and operative to provide a controlled pressure to the rear of the head of the user.

* * * * *